United States Patent [19]

Gill

[11] 4,261,220
[45] Apr. 14, 1981

[54] REMOTE CONTROL MECHANISMS

[75] Inventor: John G. Gill, Chelmsford, England

[73] Assignee: Teleflex Morse Limited, Basildon, England

[21] Appl. No.: 923,765

[22] Filed: Jul. 11, 1978

[30] Foreign Application Priority Data

Jan. 1, 1978 [GB] United Kingdom ................ 791/78

[51] Int. Cl.³ ...................... G01M 1/168; C01P 3/20
[52] U.S. Cl. ............................................. 74/501 R
[58] Field of Search ............ 74/501 R, 501 M, 501 P, 74/501.5, 501 S, 473 R

[56] References Cited

U.S. PATENT DOCUMENTS

| 2,543,965 | 3/1951 | Hamilton | 74/501 X |
| 3,177,357 | 4/1965 | Raynak | 74/501 X |
| 3,183,736 | 5/1965 | Jacobson | 74/501 |
| 4,152,950 | 5/1979 | Langford | 74/501 R |

Primary Examiner—Louis Rimrodt

Attorney, Agent, or Firm—James C. Wray

[57] ABSTRACT

The invention comprehends a remote control mechanism having a beam swingable about a pivot to transmit a pushing force to a first cable and a pulling force to a second cable which cables are connected to locations of said beam on opposite sides of said pivot, said pushing and pulling forces being reversed when said beam is swung in opposite directions, said beam also having a third cable connected thereto at said pivot, said beam also being movable in further opposite directions in a manner such as to transmit, when moved in one such direction, pushing forces to each of said first, second and third cables, and when moved in the opposite such direction, pulling forces to each of said first, second and third cables, wherein (a) said third cable is a push cable and said first and second cables are pull cables, or
(b) said third cable is a pull cable and said first and second cables are push cables.

16 Claims, 2 Drawing Figures

REMOTE CONTROL MECHANISMS

This invention relates to remote control mechanisms.

The invention (whose scope is defined in the appended claims) includes a remote control mechanism having a beam swingable about a pivot to transmit a pushing force to a first cable and a pulling force to a second cable which cables are connected to locations of said beam on opposite sides of said pivot, said pushing and pulling forces being reversed when said beam is swung in opposite directions, said beam also having a third cable connected thereto at said pivot, said beam also being movable in further opposite directions in a manner such as to transmit, when moved in one such direction, pushing forces to each of said first, second and third cables, and when moved in the opposite such direction, pulling forces to each of said first, second and third cables, wherein
  (a) said third cable is a push cable and said first and second cables are pull cables, or
  (b) said third cable is a pull cable and said first and second cables are push cables.

In my copending United States patent applications Nos. 909,607 filed May 25, 1978, and 934,743, filed Aug. 21, 1978, I have disclosed remote controlled mechanisms employing a pair of push-pull cables which upon pivotal movement of an operator lever about one axis are differentially moved and which upon pivotal movement of the operator lever about a second axis, perpendicular to the first pivotal axis, are coincidentally moved. Movement of the cables, whether differential or coincidental, causes operating movement of a controlled member.

An advantage of those remote controlled mechanisms is that whatever the operating mode, no one cable is redundant but, rather, the two cables share the load by which it follows that the life of each cable is increased.

In flexible push-pull cables as commercially manufactured there is a running clearance between the cable core and its guide casing or conduit. Normally, in installations where such cables are used, the cables would follow a tortuous path from the operator lever to the controlled member in which the cables round one or more bends. When a cable is operating in a pushing mode, the core tends to lie against the conduit at the outside of the bend. When the cable operating mode changes from push to pull, the cable tends to straighten out and moves to lie against the conduit at the inside of the bend. The converse occurs when the cable mode of operation changes from pull to push.

Such movement of the cable from the inside to the outside, and vice versa, of the bend gives rise to lost motion in the mechanism and a degree of backlash felt at the operator lever. We have now devised alternative remote control mechanisms with which such lost motion and backlash can be substantially eliminated.

In one such mechanism, the pair of flexible push-pull cables of our prior remote control mechanisms are replaced by a pair of pull cables which are supplemented by a central push cable. The pull cables are pretensioned and the push cable is prestressed in compression with the operator lever in the neutral position. When the operator lever is moved to coincidentally push the cables, the pull cables will be ineffective and the loading will be taken by the prestressed push cable. When the lever is moved to coincidentally pull the cables, the loading is predominately taken by the tensioned pull cables. When the lever is moved to differentially move the pull cables, one will be subject to compression and be ineffective, and the other will be pulled thereby solely acting to take the load, the central push cable lying along a neutral axis of movement thereby also not being active.

In another such mechanism, the pair of flexible push-pull cables of our prior remote control mechanisms are replaced by a pair of push cables which are supplemented by a central pull cable. The push cables are adjusted so as to be prestressed in compression and the pull cable is pretensioned with the operator lever in the neutral position. When the lever is moved to coincidentally push the cables, the push cables will share the loading and the central pull cable will be ineffective. When the lever is moved to coincidentally pull the cables, the pull cable will take the loading aided by the push cables. When the lever is moved to differentially move the push cables, one will be pushed and the other will be pulled so that the loading will be shared, the central pull cable lying along the neutral axis of movement and thereby being ineffective.

Each of the described mechanisms can be adjusted by prestressing the cables . . . the push cable or cables in compression and the pull cable or cables in tension . . . so as to take substantially all play out of the mechanism. As such, movement of the control lever will result at all times in positive complementary motion of a controlled member acted upon by the cables, and the mechanism can be used in any application requiring accurate two-dimensional positioning.

As the mechanism wears in use such that the cable core clearance in its conduit increases thereby resulting in a backlash condition obtaining, the cables can be individually readjusted and so prestressed to an extent to take up the play which has developed.

Another advantage of the construction is that manufacturing tolerances in the production of the cables need not be so critical since a slack fitting core in the cable conduit can be adjusted to take out the slack prior to use just as can such slack developed during use, as has been described.

Yet another advantage is that the relatively expensive push-pull cables are replaced by cables of simpler and cheaper construction, particularly the pull cable.

Further features and advantages of the present invention will appear from the following description of two embodiments thereof, given by way of example, reference being had to the accompanying drawings, in which.

Figure 1:
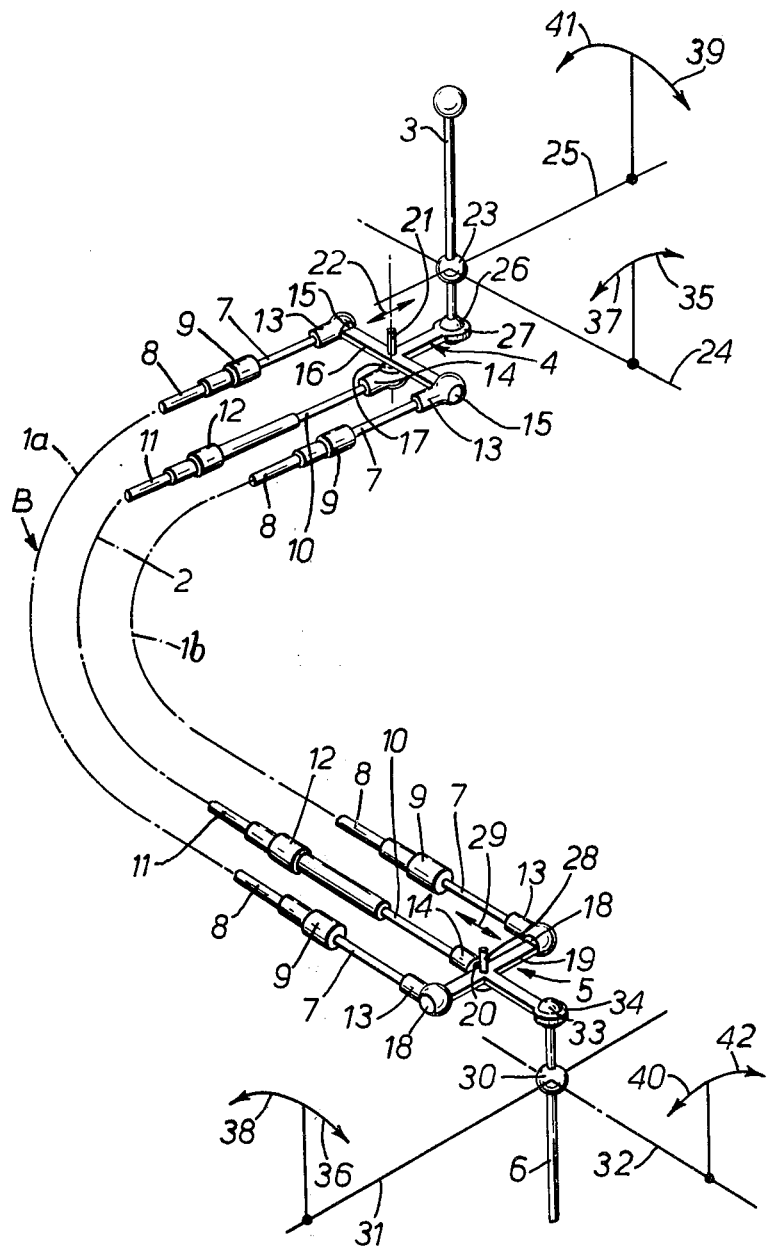
FIG. 1 is a perspective schematic view of a first remote control mechanism.

In the first remote control mechanism shown in FIG. 1, there are employed a pair of flexible pull cables 1a, 1b in conjunction with a central, flexible push cable 2 for transferring motion from a control device, in the form of an operator lever 3 and an input beam 4, to a controlled device comprising an output beam 5 and a controlled member 6.

The pull cables 1a, 1b and the push cable 2 may be of any conventional construction appropriate for cables intended to take tensile and compression loading, respectively. Suffice it for the present purposes to say that the pull cables 1a, 1b each has a core 7 slidable within a conduit 8 terminated by a fixed guide tube 9, and that the push cable 2 has a core 10 slidable within a conduit 11 terminated by a fixed guide tube 12. Each core 7 is fast at its opposite ends with terminal members 13, whilst the core 10 has its opposite ends fast with terminal members 14.

The terminal members 13 at the input end of the mechanism are connected as by ball joints 15 to the ends of the cross-bar 16 of the input beam 4 which is fashioned as a Tee-piece, whilst the terminal member 14 at the same end of the mechanism is connected as by a ball joint 17 to the centre of the same cross-bar.

The terminal members 13 at the output end of the mechanism are connected as by ball joints 18 to the ends of the cross-bar 19 of the output beam 5 which is also fashioned as a Tee-piece, and the output terminal member 14 is connected as by a ball joint 20 to the centre of that cross-bar.

The input beam 4 in this embodiment is mounted for pivotal movement in a horizontal plane about the axis of a vertical pin 21 which is guided in an elongated slot in a fixed member (not shown) so that the beam can also be linearly moved in the opposite horizontal directions indicated by the arrowed line 22.

Such pivotal and translational motion of the input beam 4 is effected by appropriate operation of the operator lever 3 which is mounted as by a ball joint 23 for pivotal movement in opposite directions about either of two mutually perpendicular axes 24 and 25, the lower end of the lever being connected as by a ball joint 26 with the stem 27 of the Tee-piece beam 4.

The output beam 5 is shown as mounted for pivotal movement in a horizontal plane (although it is by no means essential that this beam should lie in a plane parallel to that of the input beam 4 and, indeed, the output beam could be tilted even to the vertical) about the axis of a vertical pin 28 which also is guided in an elongated slot in another fixed member (not shown) so that the beam can be linearly moved in the opposite directions indicated by the arrowed line 29.

Such pivotal and translational movement of the output beam 5 is transmitted to the controlled member 6 which is mounted as by a ball joint 30 for pivotal movement in opposite directions about either of two mutually perpendicular axes 31 and 32, the upper end of the controlled member being connected as by a ball joint 33 with the stem 34 of the Tee-piece beam 5.

The terminal members 13 are constructed as in any conventional manner so that the core 7 of each push cable 1a, 1b may be adjustably tensioned. Similarly, the terminal members 14 also provide means by which the core 10 of the push cable 2 may be adjustably stressed in compression.

In the neutral position of the operator lever 3 as illustrated, the terminal members 13 are selectively adjusted so as to tightly tension the pull cores 7 which, thereby, will lie against their respective guide conduits 8 at the inside of the bend B which the cables are trained to follow. Also, in that same position of the operator lever 3, the terminal members 14 are selectively adjusted so that the push core 10 will be prestressed in compression and lie against its guide conduit 11 at the outside of the bend B.

By so prestressing the push and pull cables, lost motion in the mechanism can be substantially eliminated such that there is no free motion at the operator lever 3 when the sense of direction thereof is changed and, in consequence, the controlled member 6 will faithfully reproduce the control motion of the operator lever.

When the operator lever 3 is pivoted about the axis 24 in the direction of the arrow 35, the input beam 4 will be urged rearwardly along the line of movement 22 with the pin 21 sliding in its elongated slot, thereby to impart a pushing force to all three cables 1a, 1b and 2. The pull cables 1a, 1b will, however, be ineffective to transfer such compression loading which will be taken solely by the push cable 2 and transmitted thereby to the output beam 5 which will be caused to slide rearwardly along the line of movement 29 with the pin 28 guided in its elongated slot. Such rearward translation of the output beam 5 will pivot the controlled member 6 about the axis 31 in the direction of the arrow 36.

When the operator lever 3 is pivoted about the axis 24 in the opposite direction denoted by the arrow 37, the input beam 4 will be urged forwardly along the same line of movement 22 with the pin 21 again sliding in its elongated slot. Such movement of the input beam 4 will impart a pulling force on all three cables 1a, 1b and 2 which will coincidentally transfer that tensile loading (since a push cable can also operate in tension) such as to pull the output beam 5 forwardly along the line of movement 29, the pin 28 sliding in its elongated slot. Forward translation of the output beam 5 will pivot the controlled member 6 about the same axis 31 but in the opposite direction denoted by the arrow 38.

When the operator lever 3 is pivoted about the axis 25 and in the direction of the arrow 39, the input beam 4 is caused to swing anticlockwise about the axis of its pivot pin 21, by which to exert a pull force on the pull cable 1b and a push force on the cable 1a. The latter cable 1a will be ineffective to transmit such a compression loading, and the push cable 2 will also at the time be redundant since it is pivotally connected to the centre of the input beam 4. Therefore, the loading is transmitted solely by the pull cable 1b and transferred thereby as a moment to the output beam 5 to cause that beam to swing about the axis of its pivot pin 28 such as to pivot the controlled member 6 about the axis 32 in the direction of the arrow 40.

When the operator lever 3 is pivoted about the axis 25 in the opposite direction denoted by the arrow 41, the input beam 4 is swung clockwise about the axis of its pivot pin 21 so that the loadings on the pull cables 1a, 1b are reversed, the push cable 2 remaining redundant. Therefore, the pull cable 1a will be the one subjected to pull, and will act alone to impart a turning moment to the output beam 5 causing that beam to swing about the axis of its pivot pin 28 so as to pivot the controlled member about the axis 32 in the direction of the arrow 42.

Figure 2:
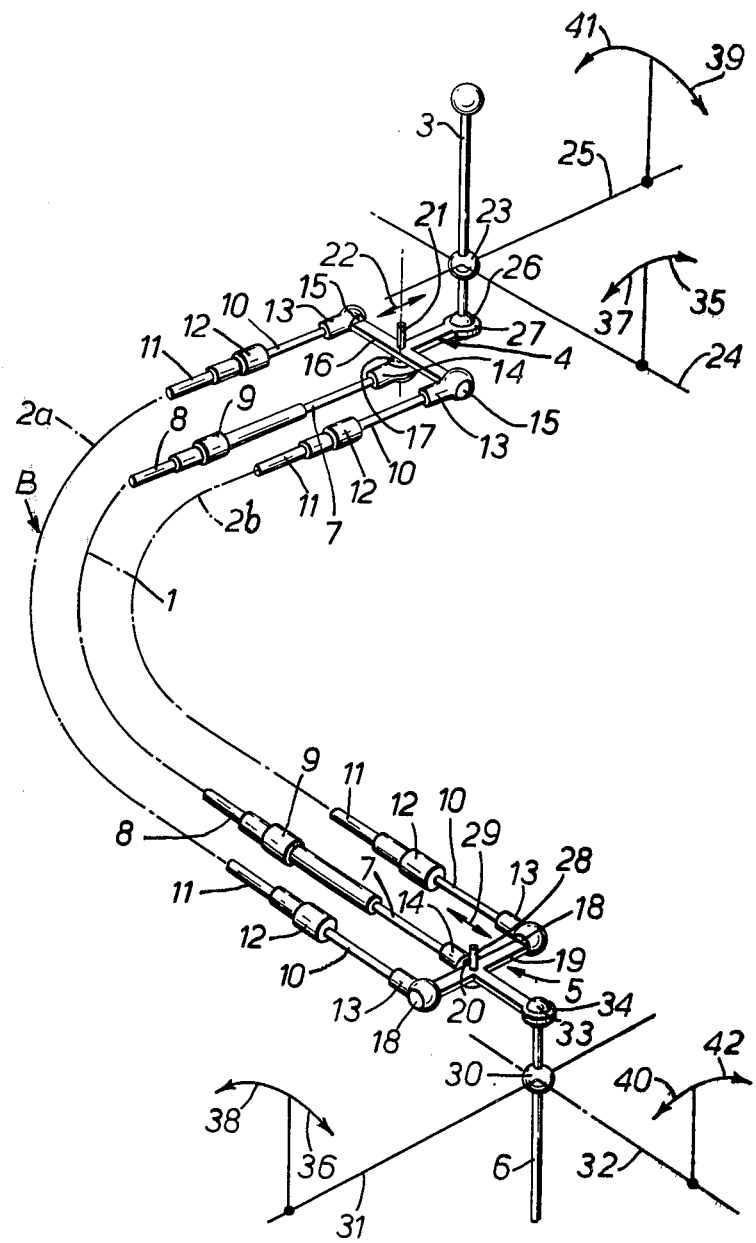
FIG. 2 is a perspective schematic view of a second remote control mechanism.

The second remote control mechanism depicted in FIG. 2 is similar to that just described except that the central cable is a flexible pull cable (not push) and the two outer cables are flexible push (not pull) cables. Like parts in the two embodiments are denoted by like reference numerals.

It is believed that the construction of the second embodiment will be clear from reference to the description of the remote control mechanism of FIG. 1. As before, the single pull cable (referenced 1) and the pair of push cables (referenced 2a, 2b) will be tightly pretensioned and put under a compression loading, respectively, when the operator lever 3 is in its neutral position so as to take up play in the mechanism afforded by the clearance between the cable cores and their respective conduits.

When the operator lever 3 is pivoted about the axis 24 in the direction of the arrow 35, the controlled member 6 is caused to pivot about the axis 31 in the direction of the arrow 36, as before. However, this time, the two outer push cables 2a, 2b will coincidentally take the (push) loading and the central, pull cable 1 will be ineffective.

When the operator lever 3 is pivoted about the axis 24 in the opposite direction denoted by the arrow 37, the controlled member 6 is again caused to pivot about the axis 31 in the opposite direction as shown by the arrow 38. This time, though, since the input beam 4 is translated forwardly, all three cables 1, 2a, 2b share the pull loading.

When the operator lever 3 is pivoted about the axis 25 in the direction of the arrow 39, the controlled member 6 is pivoted about the axis 32 in the direction of the arrow 40, as previously. Again, the central (pull) cable 1 is redundant, and the two outer (push) cables 2a, 2b are differentially moved, one subject to a push loading and the other to a pull loading, and both being capable of taking and transferring such loading as a turning moment to the output beam 5.

When the operator lever 3 is pivoted about the axis 25 in the opposite direction given by the arrow 41, the controlled member 6 is again pivoted about the axis 32 in the opposite direction denoted by the arrow 42. The central cable is still redundant, and the loading on the differentially moved outer push cables 2a, 2b is reversed, but both will still act to apply that loading as a turning moment to the output beam 5.

It is to be understood that whilst specific input and output "devices" have been featured in the present embodiments, that the invention is not confined to the particular constructions shown but could vary therefrom and still provide the described operation of the two "three cable" systems.

The input devices could, for example, take the alternative forms shown in our aforementioned patent applications. As for the output device, when the remote control mechanism is to be applied to a manual change gear box, this could also take the alternative forms as featured in those patent applications to which attention is directed for a full disclosure thereof and whose subject matter is incorporated herein insofar as it is relevant.

The advantages enumerated hereinbefore for the two generally described "three cable" systems apply also to the specific embodiments.

I claim:

1. A remote control mechanism having a beam swingable about a pivot to transmit a pushing force to a first cable and a pulling force to a second cable which cables are connected to locations of said beam on opposite sides of said pivot, said pushing and pulling forces being reversed when said beam is swung in opposite directions, said beam also having a third cable connected thereto at said pivot, said beam also being movable in further opposite directions in a manner such as to transmit, when moved in one such direction, pushing forces to each of said first, second and third cables, and when moved in the opposite such direction, pulling forces to each of said first, second and third cables, wherein
   (a) said third cable is a push cable and said first and second cables are pull cables, or
   (b) said third cable is a pull cable and said first and second cables are push cables.

2. A remote control mechanism comprising a control beam, means mounting said control beam for pivotal movement about an axis transverse to its length, said means being intermediate spaced locations of said control beam, means mounting said control beam for equal movement of said spaced locations thereof in the same direction, a controlled beam, means mounting said controlled beam about an axis transverse to its length, said means mounting said controlled beam being intermediate spaced locations of said controlled beam, means mounting said controlled beam for equal movement of said spaced locations thereof in the same direction, control links operatively coupling said control beam with said controlled beam to transmit motion of the former to the latter, said control links comprising a pair of first links respectively connecting said spaced locations of said control beam with said spaced locations of said controlled beam, said control links further comprising a second link connecting said control beam at said means thereof with said controlled beam at said means thereof, said second link being capable of operating under an axial load of one mode transmitted to it by said control beam, and said first links being capable of operating under an axial load of the opposite mode transmitted to it by said control beam.

3. A remote control mechanism as claimed in claim 2, wherein said second link is a tie and said first links are struts.

4. A remote control mechanism as claimed in claim 2, wherein said second link is a strut and said first links are ties.

5. A remote control mechanism as claimed in claim 2, wherein said second link is a flexible pull cable and said first links are flexible push cables.

6. A remote control mechanism as claimed in claim 2, wherein said second link is a flexible push cable and said first links are flexible pull cables.

7. A remote control mechanism as claimed in claim 5, wherein said flexible pull cable is pretensioned and said flexible push cables are prestressed in compression.

8. A remote control mechanism as claimed in claim 6, wherein said flexible pull cables are pretensioned and said flexible push cable is prestressed in compression.

9. A remote control mechanism as claimed in any of claims 2 to 8, wherein said second link is positioned centrally of said first links at said control beam and said controlled beam.

10. A remote control mechanism comprising a control device, a controlled device, and three control links interconnecting said control device with said controlled device to transmit motion of the former to the latter, said control device being movable in one mode to push said control links and movable in the opposite mode to pull said control links, a first and second of said control links being connected to spaced locations of said control device and said controlled device, and the third of said control links being connected to each of said control device and said controlled device at a location intermediate said spaced locations thereof, said control device being movable in another mode to exert a pushing force on one of said first and second control links and a pulling force of the other of said first and second control links with said third control link being inoperative, and said control device being movable in the opposite mode to said another mode to exert a pulling force on said one of said first and second control links and a pulling force on said another of said first and second control links with said third control link remaining inoperative.

11. A remote control mechanism as claimed in claim 10, wherein said first and second control links are such as to transmit a push loading imparted to them by said control device to said controlled device, and said third control link is such as to transmit only a pull loading imparted to it by said control device to said controlled device.

12. A remote control mechanism as claimed in claim 10, wherein said first and second control links are such as to transmit only a pull loading transmitted to them by said control device to said controlled device, and said third control link is such as to transmit a push loading imparted to it by said control device to said controlled device.

13. A remote control mechanism as claimed in claim 11, wherein said first and second control links are flexible push control cables, and said third control link is a flexible pull control cable.

14. A remote control mechanism as claimed in claim 12, wherein said first and second control links are flexible pull control cables, and said third control link is a flexible push control cable.

15. A remote control mechanism comprising an input member, an output member, and control links interconnecting said members to transfer motion of the former to the latter, said input member having spaced regions movable equally in the same first direction as said input member is moved in one operating mode, said spaced regions of said input member being movable equally in the same second direction opposite to said first direction as said input member is moved in the opposite operating mode, said spaced regions of said input member being connected to one end of respective first and second of said control links the opposite ends of which are connected to spaced regions of said output member, said first and second control links being subjected to a pushing force when said input member is moved in said one operating mode, said first and second control links being subjected to a pulling force when said input member is moved in said opposite operating mode, said spaced regions of said input member being movable in opposite directions relative to said first and second control links as said input member is moved in another operating mode to subject said first control link to a pushing force and said second control link to a pulling force, said spaced regions of said input member being movable in opposite directions relative to said first and second control links as said input member is moved in an opposite mode to said another mode to subject said first control link to a pulling force and said second control link to a pushing force, and a third control link connected to an intermediate region of each of said input and output members, said third control link being subjected to a pushing force when said input member is moved in said one operating mode, said third control link being subjected to a pulling force when said input member is moved in said opposite operating mode, said third control link lying along a neutral axis of movement with respect to said input and output member when said input member is moved in said another operating mode or said opposite operating mode thereto by which to be ineffective at those times to transmit motion, said third control link being designed such as to transmit axial loading of one mode and said first and second control links being designed such as to transmit axial loading of the opposite mode.

16. A remote control mechanism comprising a control means, a controlled means and control links interconnecting said means to move said controlled means upon movement of said control means, said control means having spaced locations and an intermediate location between said spaced locations, first and second ones of said control links being connected respectively to said spaced locations, a third one of said control links being connected to said intermediate location, movement of said control means in a first operational mode imparting a pushing force through said spaced and intermediate locations to said first, second and third links, movement of said control means in a second operational mode imparting a pulling force through said spaced and intermediate locations to said first, second and third links, movement of said control means in a third and a fourth operational mode imparting operational forces only to said control links through said spaced locations, said first link being pulled and said second link being pushed in said third operational mode, and said first link being pushed and said second link being pulled in said fourth operational mode, wherein
  (a) said third link is a push cable and said first and second links are pull cables, or
  (b) said third link is a pull cable and said first and second links are push cables.

* * * * *